United States Patent [19]

Wiegert

[11] Patent Number: 5,225,505
[45] Date of Patent: Jul. 6, 1993

[54] ACRYLIC COPOLYMERS AND THEIR USE AS COATINGS

[75] Inventor: Bernard Wiegert, Brenouille, France
[73] Assignee: Atochem, Paris-La Defense, France
[21] Appl. No.: 761,781
[22] PCT Filed: Dec. 19, 1990
[86] PCT No.: PCT/FR90/00927
  § 371 Date: Sep. 24, 1991
  § 102(e) Date: Sep. 24, 1991
[87] PCT Pub. No.: WO91/09889
  PCT Pub. Date: Jul. 11, 1991

[30] Foreign Application Priority Data

Dec. 21, 1989 [FR] France ............... 89 16989

[51] Int. Cl.$^5$ ............... C08F 2/18; C08F 212/06; C08F 220/18
[52] U.S. Cl. ............... 526/245; 526/312; 526/328.5
[58] Field of Search ............... 526/245, 312, 328.5

[56] References Cited

U.S. PATENT DOCUMENTS

| | | |
|---|---|---|
| 3,099,636 | 7/1963 | Skiles . |
| 3,384,627 | 3/1968 | Anello et al. ............... 526/245 |
| 4,147,851 | 4/1979 | Raynolds ............... 526/245 |

FOREIGN PATENT DOCUMENTS

| | | | |
|---|---|---|---|
| 753433 | 9/1970 | Belgium ............... 526/312 |
| 1115460 | 10/1961 | Fed. Rep. of Germany . |
| 2151573 | 4/1973 | France . |
| 2658198 | 8/1991 | France ............... 526/312 |
| 53-74589 | 7/1978 | Japan ............... 526/312 |
| 57-51705 | 3/1982 | Japan ............... 526/245 |
| 57-117512 | 7/1982 | Japan ............... 526/245 |
| 59-202208 | 11/1984 | Japan ............... 526/245 |
| 61-34008 | 2/1986 | Japan ............... 526/312 |
| 62-243607 | 10/1987 | Japan ............... 526/312 |

*Primary Examiner*—Joseph L. Schofer
*Assistant Examiner*—N. Sarofim
*Attorney, Agent, or Firm*—Millen, White, Zelano & Branigan

[57] ABSTRACT

These acrylic copolymers, which are useful as coatings, in particular as soil-repellent coatings for the building industry, comprise, per 100 parts by weight:

about 20 to 95 parts of at least one alkyl acrylate or methacrylate whose alkyl group has 1 to 10 carbon atoms or aryl acrylate or methacrylate whose aryl group has 6 to 10 carbon atoms, about 5 to 50 parts of at least one aminated methacrylate of the formula:

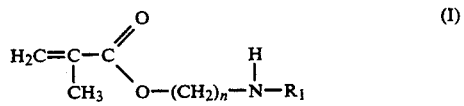

(I)

in which n is an integer between 1 and 20 and $R_1$ is an alkyl radical having 1 to 10 carbon atoms, and about 0 to 65 parts of at least one fluorinated alkyl (meth)acrylate.

15 Claims, No Drawings

ACRYLIC COPOLYMERS AND THEIR USE AS COATINGS

BACKGROUND OF THE INVENTION

The present invention relates to novel acrylic copolymers which can be used as coatings, in particular as soil-repellent coatings for the building industry.

It is customary in the building industry to use coatings for the protection of tiles against soiling, these coatings most frequently being present as resins in an organic solvent medium. It is likewise known to use resins in organic solvent medium as anti-graffiti coatings, in order to prevent deteriorations of buildings, in particular tiles and ceramic wall coatings which decorate the majority of public and private buildings. In both cases, the use of an organic solvent makes it possible, provided suitable resins are chosen, to achieve the desired goal, i.e. the protection of tiles and ceramics against soiling of any nature (blood, greases, colorants such as eosine) and especially against inks of various compositions used in felt-tip pens and indelible marker pens. However, the use of an organic solvent has obvious drawbacks with respect to odour and more generally with respect to environmental and pollution problems. In particular, the manufacture of a soil-repellent coating in an organic solvent requires recovery, purification and recycling steps of the solvent, in order to avoid its discharge into nature.

Accordingly, a constant problem with research in the area of soil-repellent coatings consists in preparing formulations in which the proportion of organic solvent used is reduced or, if possible, the use of organic solvents is even avoided, while maintaining the soil-repellent properties of the known products in the organic solvent medium at the same level.

SUMMARY OF THE INVENTION

With a view to solving the problem formulated in this manner, the present invention first relates to new acrylic copolymers comprising, per 100 parts by weight:
about 20 to 95 parts of at least one alkyl acrylate or methacrylate whose alkyl group has 1 to 10 carbon atoms or aryl acrylate or methacrylate whose aryl group has 6 to 10 carbon atoms,
about 5 to 50 parts of at least one aminated methacrylate of the formula:

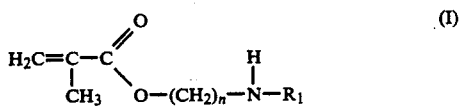

in which n is an integer between 1 and 20 and $R_1$ is an alkyl radical having 1 to 10 carbon atoms, and about 0 to 65 parts of at least one fluorinated alkyl (meth)acrylate and up to 5 parts of acrylic acid.

Fluorinated alkyl (meth)acrylate according to the present invention is understood to mean a compound of the formula:

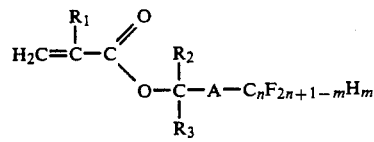

where:
$R_1$ is a methyl radical,
$R_2$ and $R_3$, identical or different, are chosen from H, $CH_3$, $CH_2-CH_3$ and CFH;
A is chosen from $CF_2$ and CFH;
n is between 1 and 19;
m is between 0 and n.

Examples of such compounds are in particular 2,2,2-trifluoroethyl acrylate and methacrylate.

The radical $R_1$ of the aminated methacrylate of the formula (II) can be chosen in particular from methyl, ethyl, n-propyl, isopropyl, n-butyl, isobutyl, tert.-butyl, isoamyl, n-hexyl, 2-ethylhexyl, n-octyl, 3,5,5-trimethylhexyl radicals, and the like. Of these, the radicals which are sterically strongly hindered, in particular the tert.-butyl radical, are preferred.

The alkyl radical of the alkyl acrylate or methacrylate can be chosen from the same radicals already mentioned as the radical $R_1$. The aryl radical of the aryl acrylate or methacrylate can be chosen in particular from phenyl, benzyl, tolyl and xylyl radicals.

The molecular weight of the copolymers according to the invention is in general between $10^5$ and $3 \times 10^6$.

The copolymers according to the invention can be present in aqueous dispersion, it being possible for the dry extract (solids content) of said dispersion to reach up to about 70% by weight. The particle size of the aqueous dispersion (determined by turbidimetry or scattering of light) can be between about 0.05 and 0.5 μm. The Brookfield viscosity at 20° C. of an aqueous copolymer dispersion according to the invention can in general be between 30 and 2000 mPa.s.

The copolymers according to the invention can furthermore contain, per 100 parts by weight of the monomers already mentioned, up to about 5 parts of acrylic acid and/or up to about 3 parts of at least one crosslinking monomer, preferably chosen from N-hydroxyalkylacrylamides and -methacrylamides, acrylamide, methacrylamide, divinylbenzene and oligoacrylates and oligomethacrylates of polyols, such as, in particular, triethylene glycol di(meth)acrylate, ethylene glycol dimethacrylate, tetraethylene glycol di(meth)acrylate, polyethylene glycol 200 di(meth)acrylate, 1,6-hexanediol di(meth)acrylate, neopentyl glycol di(meth)acrylate, 1,3-butylene glycol di(meth)acrylate, diethylene glycol di(meth)acrylate, trimethylolpropane tri(meth)acrylate, di(meth)acrylate of ethoxylated bisphenol A, pentaerythritol tetraacrylate, tripropylene glycol diacrylate, dipentaerythritol pentaacrylate, tris(hydroxyethyl) isocyanurate triacrylate, triacrylate of ethoxylated trimethylolpropane, acrylic anhydride and methacrylic anhydride.

The present invention also relates to a process for the preparation of a copolymer such as described above, which comprises the copolymerisation of monomers in an aqueous emulsion, characterised in that the monomer mixture to be polymerised comprises, per 100 parts by weight,
about 20 to 95 parts of at least one alkyl acrylate or methacrylate whose alkyl group has 1 to 10 carbon atoms or aryl acrylate or methacrylate whose aryl group has 6 to 10 carbon atoms,
about 5 to 50 parts of at least one aminated methacrylate of the formula:

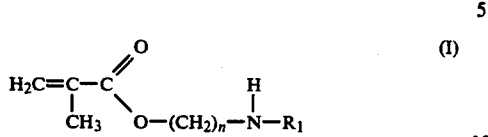

in which n is an integer between 1 and 20 and $R_1$ is an alkyl radical having 1 to 10 carbon atoms, and
about 0 to 65 parts of at least one fluorinated alkyl (meth)acrylate and up to 5 parts of acrylic acid, and 0 to 3 parts of at least one crosslinking monomer such as described above.

The polymerisation is in general carried out at a temperature between about 55° C. and 90° C., in the presence of at least one initiator capable of generating free radicals, over a period of about 2 to 8 hours.

The polymerisation initiator can in particular be chosen from persulphates, peroxides, hydroperoxides and diazo compounds; when an alkali metal persulphate is chosen, it can be used in combination with a reducing agent chosen from polyhydroxyphenols, sodium sulphite and bisulphite, dimethylaminopropionitrile, diazomercaptans and ferricyanides. The initiator and, if present, the reducing agent can be used in an amount of 0.1 to 2% by weight each, relative to the total amount of monomers present.

As is known, the process according to the invention can take place in the presence of at least one anionic, cationic or nonionic emulsifying agent, of which usually 0.5 to 10% by weight, relative to the total amount of monomers present, are used. Examples of emulsifying agents which can be used for carrying out a polymerisation process according to the present invention are in particular alkali metal salts and ammonium salts of alkyl-, aryl-, alkaryl- and aralkyl sulphonates and -sulphates or of polyether sulphates; the corresponding phosphates and phosphonates; and fatty acids, esters, alcohols, amines, amides and ethoxylated alkylphenols.

Moreover, it may be advantageous to carry out the polymerisation in the presence of 0.1 to 0.5 parts of a buffer, such as sodium bicarbonate.

As is well known in this technical field, the pH of the aqueous dispersion obtained by the process according to the invention can be adjusted to the desired value by addition of alkali or amine. If desired, the copolymer according to the invention can be isolated from the aqueous dispersion containing it by the well known techniques of flocculation, freezing and atomisation.

Finally, the present invention relates to a process for the coating of a substrate, characterised in that said substrate is coated with a formulation comprising an aqueous dispersion of an acrylic copolymer such as defined above. According to another embodiment of the coating process, a formulation comprising a perfluorinated copolymer such as described for example in FR-A-2,175,332 and FR-A-2,155,133 in a mixture with the copolymer according to the invention is applied to the substrate. Indeed, such a formulation has the advantage, even when diluted to less than 2% in water, that it does not flocculate at all.

The aqueous dispersion of acrylic copolymer according to the invention has the following characteristics:

very good resistance to freezing and thawing cycles between temperatures of −15° and +25° C.,
in contrast to the majority of dispersions of anionic or nonionic character, it is not changed by the addition of polyvalent salts, such as $Ca^{++}$, $Fe^{+++}$, and the like, even in the presence of a light alcohol, such as methanol or ethanol, i.e. its viscosity is not substantially increased and no coagulation is observed,
it is not affected by the addition of a compound of cationic character, such as a quaternary ammonium salt.

The examples below are given for illustration and do not limit the present invention.

EXAMPLE 1

In a reactor, a mixture of 76 parts by weight of isobutyl methacrylate, 23 parts by weight of tert.-butylaminoethyl methacrylate and 1 part by weight of acrylic acid is polymerised batchwise in an emulsion in 150 parts of water in the presence of 0.35 part by weight of ammonium persulphate, 0.35 part by weight of sodium metabisulphite as initiators and in the presence of 3 parts by weight of sodium nonylphenyl sulphate containing 25 mol of ethylene oxide as surfactant. The polymerisation is carried out at 72° C. for 3½ hours. This gives an aqueous dispersion having a dry extract content of 40% by weight, a pH of 9.0 and particles whose average size, as measured by turbidimetry, is 0.22 μm. This dispersion has a Brookfield viscosity at 20° C. of 100 mPa.s.

EXAMPLE 2

The procedure of Example 1 is repeated, except that the proportions of monomers are changed as follows:
89 parts by weight of isobutyl methacrylate,
10 parts by weight of tert.-butylaminoethyl methacrylate, and
1 part by weight of acrylic acid.
The dispersion obtained has the following characteristics:
pH of 7.9,
dry extract content of 39.5% by weight.

EXAMPLE 3

The procedure of Example 1 is repeated, except that the proportions of monomers are changed as follows:
59 parts by weight of isobutyl methacrylate,
40 parts by weight of tert.-butylaminoethyl methacrylate, and
0 1 part by weight of acrylic acid.
The dispersion obtained has the following characteristics:
pH of 9.5,
dry extract content of 39.5% by weight,
Brookfield viscosity at 20° C. of 90 mPa.s.

EXAMPLE 4

The procedure of Example 1 is repeated, except that the polymerisation time is extended to 4 hours 30 minutes and the monomer system is changed as follows:
42 parts by weight of methyl methacrylate,
10 parts by weight of tert.-butylaminoethyl methacrylate,
47 parts by weight of n-butyl acrylate, and
part by weight of acrylic acid.
The dispersion obtained has the following characteristics:
dry extract content of 39%,
average particle size: 0.23 μm.

EXAMPLE 5

The procedure of Example 4 is repeated, except that the proportions of monomers are changed as follows:
27 parts by weight of methyl methacrylate,
25 parts by weight of tert.-butylaminoethyl methacrylate,
47 parts by weight of n-butyl acrylate, and
1 part by weight of acrylic acid.

The dispersion obtained has a dry extract content of 39%.

EXAMPLE 6

The procedure of Example 4 is repeated, except that the monomer system is changed as follows:
88 parts by weight of 3,5,5-trimethylhexyl acrylate,
10 parts by weight of tert.-butylaminoethyl methacrylate,
1 part by weight of acrylic acid and
1 part by weight of N-methylolmethacrylamide.

The dispersion obtained has a pH of 8.3, a dry extract content of 39.5% and a Brookfield viscosity at 20° C. of 128 mPa.s.

EXAMPLE 7

In a reactor, a mixture of 50 parts by weight of 2,2,2-trifluoroethyl methacrylate, 24.5 parts by weight of tert.-butylaminoethyl methacrylate, 1 part by weight of acrylic acid and 0.5 part by weight of N-methylolmethacrylamide is polymerised batchwise in an emulsion in 300 parts by weight of water in the presence of 0.35 part by weight of ammonium persulphate, 0.35 part by weight of sodium metabisulphite as initiators and in the presence of 3 parts by weight of (2,2-dimethyl-4,4-dimethylbutyl)phenol polyoxy ether containing 40 mol of ethylene oxide as surfactant. The polymerisation is carried out at 72° C. for 3 hours. This gives an aqueous dispersion having a pH of 8.3, dry extract content of 25% by weight and particles whose average size is 0.19 $\mu$m.

I claim:

1. Acrylic copolymer comprising, per 100 parts by weight:
   about 20 to 95 parts of at least one alkyl acrylate or methacrylate whose alkyl group has 1 to 10 carbon atoms or aryl acrylate or methacrylate whose aryl group has 6 to 10 carbon atoms,
   about 5 to 50 parts of at least one aminated methacrylate of the formula:

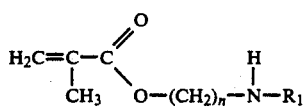 (I)

in which n is an integer between 1 and 20 and $R_1$ is an alkyl radical having 1 to 10 carbon atoms,
   about 0 to 65 parts of at least one fluorinated alkyl (meth)acrylate,
   and not more than 5 parts of acrylic acid.

2. Copolymer according to claim 1, further comprising, per 100 parts by weight, up to 3 parts of at least one crosslinking monomer.

3. A copolymer according to claim 1 wherein the fluorinated alkyl methacrylate is a compound of the formula:

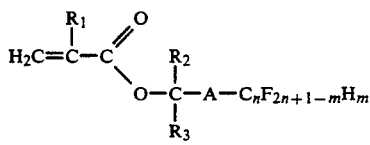

where:
   $R_1$ is a methyl radical,
   $R_2$ and $R_3$, identical or different, are chosen from H, $CH_3$, $CH_2$-$CH_3$ and CFH,
   A is chosen from $CF_2$ and CFH,
   n is between 1 and 19;
   m is between 0 and n.

4. A copolymer according to claim 1 as an aqueous dispersion.

5. A copolymer according to claim 4, wherein the particle size of the dispersion is between 0.05 and 0.05 $\mu$m.

6. A copolymer according to claim 4, wherein the Brookfield viscosity at 20° C. of the dispersion is between 30 and 300 mPa.s.

7. A method of repelling soil in the building industry comprising coating a building substrate with an aqueous dispersion of a copolymer according to claim 1.

8. A copolymer according to claim 3, further comprising, per 100 parts by weight, up to 3 parts of at least one crosslinking monomer.

9. A copolymer according to claim 2, present as an aqueous dispersion.

10. A copolymer according to claim 3, present as an aqueous dispersion.

11. A copolymer according to claim 8, present as an aqueous dispersion.

12. A method of repelling soil in the building industry comprising coating a building substrate with an aqueous dispersion of a polymer according to claim 2.

13. A method of repelling soil in the building industry comprising coating a building substrate with an aqueous dispersion of a polymer according to claim 3.

14. A method of repelling soil in the building industry comprising coating a building substrate with an aqueous dispersion of a polymer according to claim 13.

15. A copolymer according to claim 1, containing said at least one fluorinated alkyl (meth)acrylate.

* * * * *